Oct. 20, 1953    G. HOLZMAN ET AL    2,656,397
ISOMERIZATION AND SEPARATION OF XYLENES
Filed March 8, 1952    3 Sheets-Sheet 1
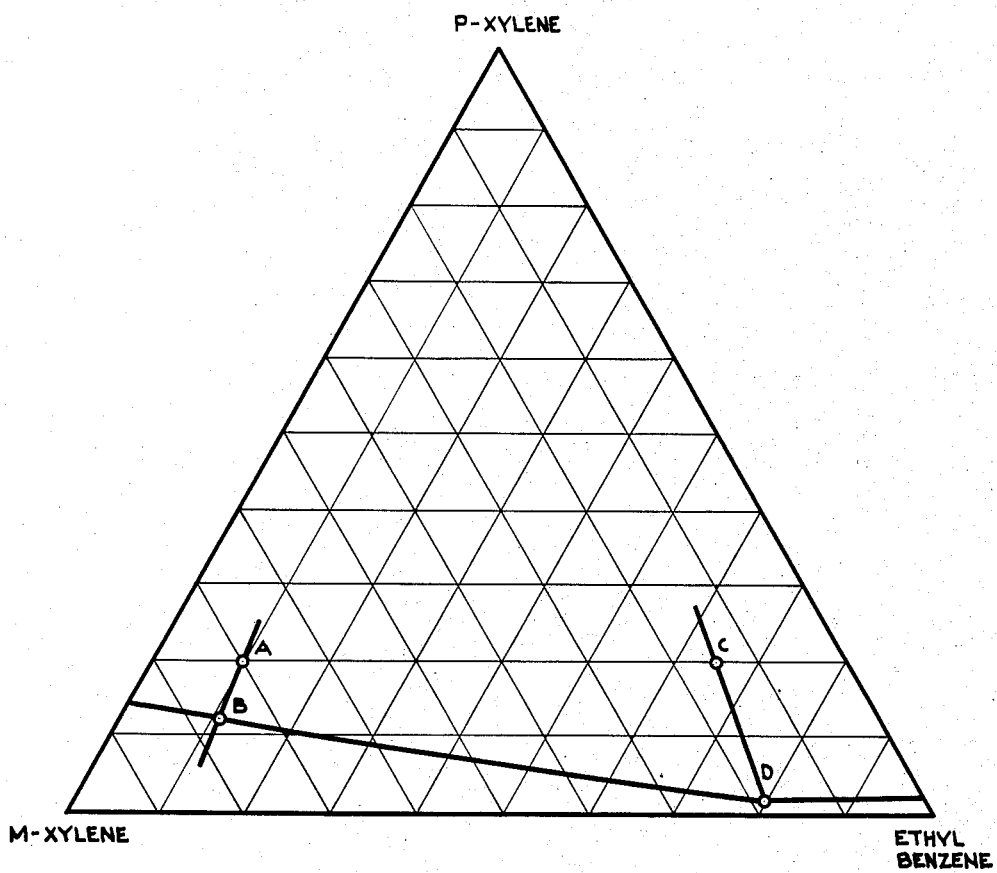
Fig. I
Inventors: George Holzman
George M. Good
By: C. J. Ott
Their Attorney Oct. 20, 1953    G. HOLZMAN ET AL    2,656,397
ISOMERIZATION AND SEPARATION OF XYLENES
Filed March 8, 1952    3 Sheets-Sheet 2
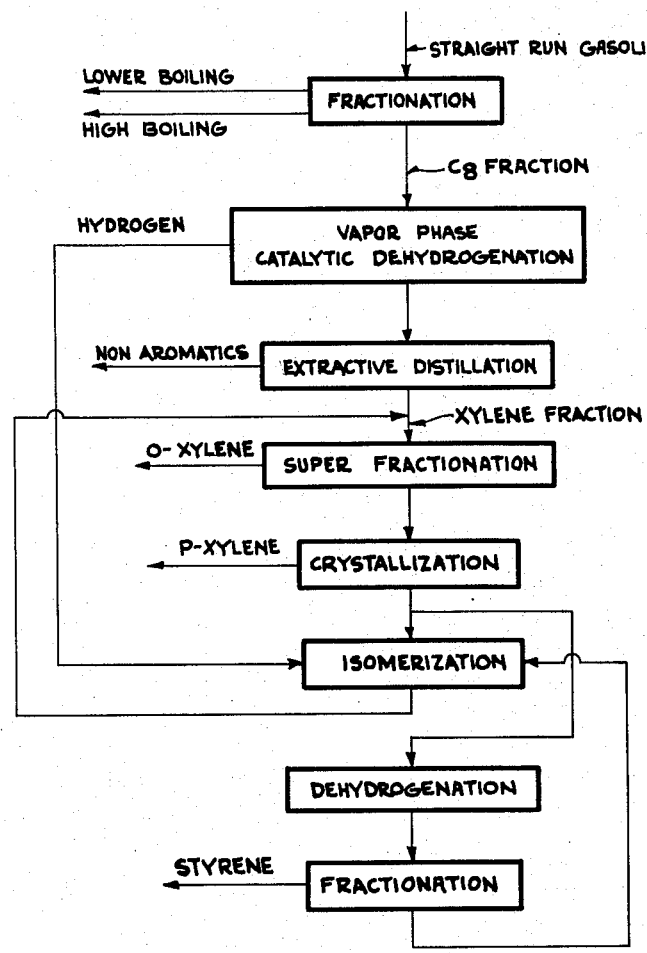
Fig. II
Inventors: George Holzman
George M. Good
By: C. J. Ott
Their Attorney

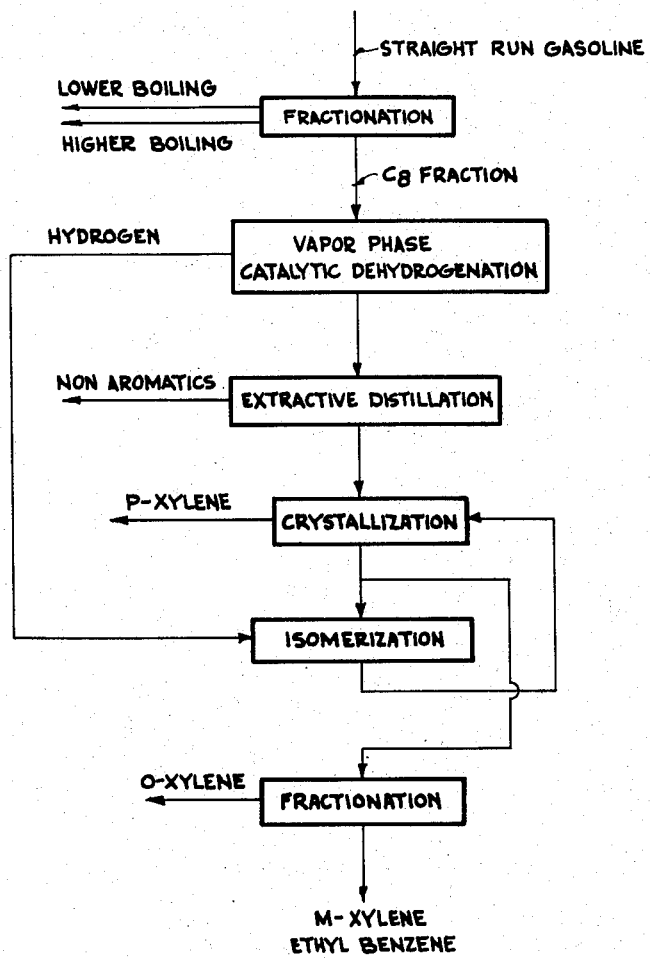
Fig. III

Patented Oct. 20, 1953

2,656,397

UNITED STATES PATENT OFFICE 2,656,397

ISOMERIZATION AND SEPARATION OF XYLENES

George Holzman, Walnut Creek, and George M. Good, Albany, Calif., assignors to Shell Development Company, Emeryville, Calif., a corporation of Delaware Application March 8, 1952, Serial No. 275,546

2 Claims. (Cl. 260—668)

This invention relates to the treatment of individual xylenes to convert them into more desired isomeric forms and to the treatment of mixtures of xylene to increase the proportion of one or more desired isomers and facilitate their separation from such mixtures. A particular aspect of the invention relates to the treatment of narrow boiling $C_8$ hydrocarbon fractions of petroleum oils to produce and separate xylenes, including ethyl benzene. A further practical aspect of the invention relates to the treatment of mixtures of various xylenes with ethyl benzene in a manner to facilitate the recovery of p-xylene and/or m-xylene.

The process of the invention and the variations hereinafter described are based upon discoveries concerning the behavior of the xylene isomers and their mixtures when subjected to the action of special promoted catalysts under appropriate special conditions. The catalyst which will later be described in more detail is a high surface microporous xerogel containing alumina and promoted with a small controlled amount of fluorine. The catalyst is employed under special conditions which involve pressure and the use of hydrogen.

The $C_8$ alkyl aromatic hydrocarbons with which the invention is particularly concerned are listed in the following table along with their boiling points, the boiling points of their fully saturated naphthenic derivatives, and their concentrations in mixtures at equilibrium at different temperatures.

TABLE I

| | Boiling Point, °C. | Boiling Point of Naphthene, °C. | Equilibrium Concentrations Mole Percent [1] | | |
|---|---|---|---|---|---|
| | | | 427° C. | 527° C. | 627° C. |
| o-xylene | 144 | 123.4–129.7 | 22.4 | 22.8 | 23.1 |
| m-xylene | 139 | 120.1–124.5 | 47.8 | 45.8 | 43.9 |
| p-xylene | 138 | 119.4–124.3 | 21.5 | 20.6 | 19.8 |
| Ethyl benzene | 136 | 131.18 | 8.3 | 10.8 | 13.2 |

[1] Taken from Pitzer et al., Bur. Standards J. Research, 37, 95 (1946).

Figure I of the accompanying drawing is a solid-liquid phase diagram for mixtures of the last three isomers listed above.

The xylenes are important chemicals and find wide and varied application. In some of these applications only one or another of the four isomers is suitable, and in most cases it is found that one or another of the four isomers is superior to the others or to various mixtures. Each of the four isomers is in demand in substantially pure form. Unfortunately, however, these hydrocarbons are nearly always obtained as mixtures including all of the four isomers and the separation of the individual isomers from such mixtures is difficult and costly. Although there are several different schemes for separating one or more of the isomers from the mixtures, the usual methods do not effect a complete separation; they allow the separation of part of the desired isomer or isomers and generally leave a considerable remainder which is not usually profitable to further resolve. The usual methods start out with separating o-xylene. Although this isomer boils quite close to the other isomers, it can be separated in fair purity by so-called superfractionation. Most commercial operations stop at this point. If desired, however, a part of the p-xylene can be separated from the remaining mixture by fractional crystallization as is, or in the form of an adduct. This operation is quite costly and, furthermore, is incapable of recovering all of the p-xylene that may be present. (See the mentioned solid-liquid phase diagram.) Meta-xylene can be recovered from the residue but this requires a complicated and costly process involving reaction of the m-xylene to produce a quite different compound, e. g. the sulfonate, followed by separation of the compound formed and its subsequent decomposition to reform the desired xylene. Another possible but costly method for separating the isomers is to remove the o-xylene by fractionation and then hydrogenate the resulting ortho-lean mixture. If separation of the o-xylene is complete and the hydrogenation is carried to completion, the resulting mixture of naphthenes can be further resolved by superfractionation. The two resulting separate fractions can then be dehydrogenated to recover substantially pure ethyl benzene on the one hand and a mixture of p-xylenes and m-xylenes on the other. The p-xylenes may then be partially removed from the m-xylenes by crystallization, leaving a fairly concentrated m-xylene fraction.

The various schemes for resolving the usual mixtures would be considerably improved if a suitable isomerization process were available. Several methods for the isomerization of these xylenes are known. These methods are generally effective in isomerizing a single xylene or even mixtures of o-xylene, m-xylene, and p-xylene, but they are of little help in the separation in the usual case where ethyl benzene is also present in an appreciable concentration. Thus, it is known that the xylenes can be isomerized by the use of such catalysts as aluminum chloride, boron fluoride, liquid hydrofluoric acid and the like. These processes involve long contact times and the handling of extremely corrosive and dangerous materials. Also, these catalysts are known to be exceptionally active catalysts for alkylation and dealkylation reactions and cause a substantial amount of disproportionation of the feed to benzene, toluene, and a wide variety of higher alkylated aromatic hydrocarbons. In general, the methyl groups in xylenes are quite stable and also quite difficult to shift. The ethyl group in ethyl benzene on the other hand is by comparison much more labile. Consequently, if ethyl benzene is present in the feed material it is largely decomposed and converted into a host of disproportionation products. If only a small amount of ethyl benzene is present, this loss can be tolerated; however, if ethyl benzene is present in any appreciable concentration, as it usually is in commercial feed stocks, its loss can not be justified.

In order to overcome the slowness, danger and high cost of the known liquid phase isomerization methods, attention has been directed to the development of a vapor phase process. Thus Reeves (U. S. 2,403,757) has shown that the xylenes can be isomerized by treating them under what are essentially the conventional catalytic cracking conditions with the conventional catalyst used commercially for catalytic cracking of hydrocarbon oils, namely, a synthetic silica-alumina composite. However, Reeves used mixtures of xylenes which contained at most only 5% of ethyl benzene. It is known that ethyl benzene is cracked under these conditions (see Ind. Eng. Chem. 37, 1169 (1945)). Bennett and Bailey, Jr., (U. S. 2,564,388) have shown that the process can be materially improved both from the standpoint of activity and selectivity if about 0.6 mole of steam are employed per mole of the hydrocarbon feed. Hydrogen was shown to be also effective but not as effective as steam. In this work, xylene mixtures containing a somewhat higher and more nearly normal concentration of ethyl benzene were used. Bennett and Bailey, Jr., point out that the ethyl benzene is largely cracked but its presence is desirable to prevent (by mass action effect) loss of xylenes through isomerization to ethyl benzene.

In our copending application, Serial No. 234,902, filed July 2, 1951, we have shown that the process may be materially improved from the isomerization standpoint by applying a cracking catalyst containing a small amount of platinum promoter. In this case hydrogen and pressure are essential whereas steam is not effective. The process not only affords more rapid isomerization but differs from the prior known isomerization processes in that ethyl benzene is isomerized to a much greater extent. Even though the isomerization selectivity for ethyl benzene is rather low (about 50%), it therefore, for the first time becomes possible to convert ethyl benzene to a substantial extent into o-xylene, m-xylene, and p-xylene. The chief disadvantages of this process are the high cost of the catalyst and the fact that an appreciable amount of the feed is converted into naphthenes by hydrogenation. Thus, a catalyst containing only a few tenths of a per cent platinum costs several dollars per pound. A single catalytic reactor filled with this catalyst therefore requires a very large capital expenditure. The hydrogenation of part of the aromatic feed is not particularly bad from the standpoint of hydrogen cost or loss of material since the hydrogenated material may be recycled. When applied in a xylene separation scheme, such as mentioned above, however, the hydrogenation of part of the mixture introduces complications due to the changed boiling points of the materials.

In the process of the present invention these difficulties are largely overcome by employing an isomerization process which has the following characteristics:

1. Ethyl benzene is not appreciably converted.
2. A catalyst which is devoid of hydrogenation-dehydrogenation promoters is used; consequently the partial hydrogenation of the xylene feed is eliminated.
3. The catalyst is relatively inexpensive.
4. The handling of corrosive liquids and sludges is avoided.
5. The isomerization is rapid and more selective.

The first item might appear offhand to be disadvantageous, but it is not, since it is better to conserve or recover the ethyl benzene as a useful product than to convert it inefficiently into a mixture of xylenes which have a low value in admixture and is difficult and costly to separate. When ethyl benzene is not appreciably converted, recycle operation may be more satisfactorily employed; the ethyl benzene quickly builds up to a concentration which is sufficiently high to make recovery or separate treatment feasible. Also, as will be seen from the mentioned solid-liquid-phase diagram in Figure I of the drawing, the percentage recovery of p-xylene in such mixtures is considerably increased when the mixture is rich in ethyl benzene. Thus, if a mixture containing 20% p-xylene, 70% m-xylene and 10% ethyl benzene (represented by point A in Figure I) is cooled, p-xylene crystallizes until the composition of the liquid corresponds to that at point B. The maximum theoretical recovery of p-xylene is, therefore, about 40%. If, on the other hand, the concentration of p-xylene is retained the same (20%) but the concentration of ethyl benzene is increased, the amount of p-xylene recoverable increases until a line connecting the corner "p-xylene" and the composition point (point C) passes through the eutectic point (point D) at which point it is possible to recover about 90% of the p-xylene by crystallization.

It is found that isomerization having the above-mentioned characteristics can be obtained if the feed is treated under appropriate conditions with a xerogel catalyst containing alumina (and which is devoid of platinum or other hydrogenation promoters) and promoted with a small and controlled amount of fluorine.

The catalyst used in the process of the present invention is a high surface microporous xerogel containing alumina and promoted with a small controlled amount of fluorine. It is essential that the catalyst have a large available surface of the order of 80 square meters per gram or more. Such surface is obtained by employing a material having a microporous structure, e. g. xerogels. It is also essential that the catalyst contain alumina. Thus, the various high surface aluminas such, for instance, as the commercial aluminas known as Uvergel, Uvergel-x, Unigel and Unigel-x (Harshaw Chemical Company), grades F-1, F-3, F-10, F-11, H-40 and H-41 (Aluminum Ore Company), and Porocell (Porocell Corporation) are suitable.

It is also possible to use various synthetic xerogels in which the alumina is composited with silica, beryllia, zirconia, and/or magnesia, and also some aluminous clays. The alumina content of such materials should be at least 10%. These various base materials generally are quite active cracking catalysts. Only those composites that do not cause excessive cracking should be applied. The various bases also have some moderate isomerization activity but when used alone they require the use of temperatures in the range where ethyl benzene is extensively degraded. Consequently, they are not selective with feeds containing any appreciable amount of ethyl benzene (e. g. 8% or more). In order to provide a catalyst capable of affording the desired selective isomerization it is essential that the above base material be promoted with fluorine. It is also important that the concentration of fluorine in the catalyst be carefully controlled. The minimum effective concentration of fluorine is somewhat below 0.5%. The maximum applicable concentration is about 5%. Preferred concentrations are between about 0.5% and about 3%. The fluorine promoter may be incorporated in the catalyst in any one of a number of ways. Thus, the alumina may be treated with hydrogen fluoride, ammonium fluoride, fluoboric acid or any other known fluoriding agent either in the vapor phase or in a suitable solution. One suitable method, by way of example, is to dissolve the calculated amount of hydrogen fluoride in such an amount of water that the whole solution will just be imbibed by the adsorptive alumina; to adsorb the solution in the adsorptive alumina and then dry the composite.

In order to effect the isomerization without appreciable conversion of the ethyl benzene, it is essential that the conditions be properly chosen. The catalyst normally has a fairly strong cracking tendency. If it is used under normal conditions the ethyl benzene may be largely destroyed. In order to selectively effect the desired isomerization without destroying ethyl benzene, it is essential that the operation be carried out in the vapor phase in the presence of hydrogen under pressure and that the temperatures be adjusted in accordance with the other conditions.

Since the catalyst is devoid of any of the known usual hydrogenation promoters the reason for the necessity of using hydrogen is not understood. It is, nevertheless, found that other inert diluent gases, such as nitrogen, cannot be substituted for the hydrogen. The effect of the hydrogen is to greatly increase the isomerization activity. This is illustrated in the following example:

*Example I.*—A commercial m-xylene fraction was isomerized using a catalyst prepared by promoting a microporous alumina (Alorco Grade F-10) with 0.5% fluorine. The isomerization was carried out under constant conditions of temperature and pressure with hydrogen and with nitrogen and the extent of isomerization was measured in terms of the closeness of approach of the o-xylene concentration to the equilibrium concentration. Thus, the per cent isomerization is expressed as the per cent of the maximum o-xylene equilibrium concentration.

TABLE II

|  | LHSV [1] | Percent Isomerization | Percent [2] Isomerization |
| --- | --- | --- | --- |
| Hydrogen, 6 Moles/Mole of Feed | 3.8 | 76 | 76 |
| Nitrogen, 6 Moles/Mole of Feed | 4.4 | 21 | 37 |

[1] LHSV=Liquid hourly space velocity.
[2] Corrected to a common LHSV.

Also, steam cannot be substituted for hydrogen. In fact, it is desirable to retain the reaction system as dry as practically possible. Thus, while it is not essential to subject the feed to a special drying treatment, the inclusion of steam or the use of a particularly wet feed containing upwards of five mole per cent water should be avoided.

The amount of hydrogen to be employed may be as low as one mole per mole of hydrocarbon feed, but it is preferably somewhat more, e. g. a ratio of from 2–10 or more moles per mole of hydrocarbon feed.

It is also essential in the present process to effect the treatment under a substantial pressure. The importance of pressure is illustrated in the following example:

*Example II.*—A commercial m-xylene fraction was isomerized using a catalyst prepared by promoting a commercial microporous alumina (Alorco Grade A-10) with 0.5% fluorine. The isomerization was carried out under constant conditions of temperature and hydrogen-hydrocarbon ratio. The extent of isomerization was determined and expressed as mentioned above.

TABLE III

| Pressure | LHSV | Percent Isomerization | Percent [1] Isomerization |
| --- | --- | --- | --- |
| 300 p. s. i. g. | 3.8 | 76 | 76 |
| 0 p. s. i. g. | 4 | 22 | 25 |

[1] Corrected to a common LHSV.

Pressures between about 100 p. s. i. g. and 700 p. s. i. g. are preferred but somewhat lower pressures, e. g. 50 p. s. i. g., or higher pressures, e. g. 1000 p. s. i. g., may be employed.

Under the conditions just described, the isomerization may be carried out at temperatures as low as about 350° C. However, the isomerization rate increases as the temperature is increased and it is, therefore, preferable to use somewhat higher temperatures. On the other hand, if the temperature is increased too much, the selectivity of the process falls off markedly, i. e., the ethyl benzene is attacked. The maximum allowable temperature for selective operation is about 485° C.; this upper limit is rather critical.

The space velocity is adjusted in accordance with the other process conditions to afford a practical degree of conversion. In general, liquid hourly space velocities of the order of 1 to 5 will be found most practicable but lower or higher space velocities may be applied. The liquid hourly space velocity (LHSV) is defined as the volumes of hydrocarbon feed, measured as a liquid, passed in contact with the volume of the catalyst per hour.

The operation is effected with the hydrocarbon in the vapor phase. The hydrocarbon vapor and hydrogen may be contacted with the catalyst in any of the usual ways. Thus, the vapors may be passed through a fixed or moving bed of granules of the catalyst or, if desired, one of the systems using the catalyst in powder form may be employed. The product vapors can be cooled to condense the liquid hydrocarbons. The uncondensed gas, consisting largely of hydrogen, may then be recycled. There is no measurable consumption of hydrogen in the reaction but small amounts of hydrogen are lost in solution in the liquid product and in leakage. It is, therefore, necessary to supply a small amount of hydrogen from time to time to maintain the supply in the reaction system. Also, the hydrogen gas, if it is recycled, gradually becomes diluted with small amounts of methane, etc., formed in the process so that after a period of time the purity of the hydrogen may be found to have fallen off. The accumulation of such diluents in the hydrogen does no particular harm, however, since hydrogen of only 50% purity is suitable and the concentration of hydrogen generally levels out due to the continuous loss of hydrogen and impurities in solution in the liquid product and the replenishment with fresh hydrogen.

While the isomerization just described can be applied for the treatment of a pure xylene isomer or any mixture of xylene isomers which is not already at equilibrium, it is particularly adapted for the treatment of xylene fractions containing ethyl benzene in appreciable amounts and substantially free of non-aromatic hydrocarbons. The xylene fractions obtained from petroleum distillates through various dehydrogenation processes are found to contain some ethyl benzene and, in most cases, the amount is above that of the equilibrium concentration, i. e., above about 8%. Xylene fractions obtained from petroleum and containing 40% and more ethyl benzene have been encountered. Also in the various separation processes where recycling is resorted to, concentrations of ethyl benzene of 25% or more are common.

Two such processes in which the isomerization is particularly suited are illustrated by the process flow schemes of Figures II and III of the accompanying drawing.

Referring to Figure II a straight run petroleum, preferably containing naphthenes, is first fractionated to separate a C8 fraction. This fraction is catalytically dehydrogenated to convert the C8 naphthenes to the corresponding aromatic hydrocarbons. Any of the conventional dehydrogenation processes which are suitable for dehydrogenating naphthenes may be used. One suitable process is the so-called platforming process which is described in U. S. Patent No. 2,479,110. The product is then separated into an aromatic fraction and a non-aromatic fraction by any suitable method. The known extractive distillation process which is currently used for this separation is suitable. The aromatic fraction consists essentially of C8 aromatics. The following analyses are typical:

| Composition, Percent | I | II | III | IV |
|---|---|---|---|---|
| o-xylene | 11 | 20 | 11.6 | 17.4 |
| m-xylene | 38 | 33.9 | 34.2 | 34.9 |
| p-xylene | 12 | 14.8 | 14.7 | 15.2 |
| Ethyl benzene | 39 | 30.3 | 38.3 | 31.5 |
| Non-aromatics | 1 | 1 | 1 | 1 |

The aromatic fraction is then subjected to superfractionation to separate relatively pure o-xylene as the bottom product. Fractionation to recover 90–93% of o-xylene of 90–93% purity is commercially feasible. The product from which the o-xylene has been substantially completely removed is then treated to recover substantially pure p-xylene. This may be effected by chilling to crystallize out the p-xylene. Also, if desired, an adduct forming agent, e. g. carbon tetrachloride, may be used in the crystallization step.

If the isomerization step were not involved, the composition of the feed to the crystallization step would in a typical case be as follows (ex. feed I above):

| | Per cent |
|---|---|
| o-Xylene | 1.1 |
| m-Xylene | 42 |
| p-Xylene | 13.4 |
| Ethyl benzene | 43 |
| Non-aromatics | 1 |

The maximum theoretical recovery of p-xylene by chilling this composition is about 46–48% of the p-xylene present; that is, from 100 moles of initial feed (I) about 5.7 moles of p-xylene could be recovered. If it is attempted to recover more of the p-xylene, m-xylene begins to crystallize out. However, due to the following isomerization step and the recycle of the isomerized product, the composition of the feed to the crystallization step is changed. A typical composition of the composite feed to the crystallization step is as follows:

| | Per cent |
|---|---|
| o-Xylene | 1.4 |
| m-Xylene | 37 |
| p-Xylene | 13.6 |
| Ethyl benzene | 48 |
| Non-aromatics | 1 |

With a recycle rate of 60 moles per 100 moles of fresh feed, the maximum theoretical recovery of p-xylene is increased to about 54%, and about 10.5 moles of p-xylene can be recovered per 100 moles of fresh feed.

The product remaining after the crystallization of p-xylene is split into two portions. One portion is subjected to the described isomerization step and recycled as described. The other portion may be withdrawn from the system and utilized in any desired manner. Alternatively, this portion may be subjected to a separate dehydrogenation treatment to convert part of the ethyl benzene to styrene. This dehydrogenation is best effected in the presence of a large amount of steam, e. g. 5–20 moles per mole of hydrocarbon feed, at a relatively high temperature, e. g., 590–630° C., with any of the catalysts commonly used for the production of butadiene from butylene. One suitable catalyst is, for example, iron oxide promoted chromium oxide and potassium oxide. The conversion is generally held relatively low, e. g. 5–40%. The styrene may be readily separated from the product by fractionation or other means. The remaining mixture of xylene and ethyl benzene is then recycled to the isomerization step from whence it is in part recycled to the o-xylene separation step as indicated.

The method illustrated in Figure III is similar to that illustrated in Figure II down through the extractive distillation step. In this second method the o-xylene is not first removed. The p-xylene is recovered in part by fractional crystallization as described above. The mother liquor is then divided into two portions: one portion is subject to superfractionation to separate substantially pure o-xylene on the one hand and a mixture of m-xylene and ethyl benzene containing some p-xylene on the other hand. The second portion is subjected to the described isomerization treatment and then recycled to the crystallization step. This method produces somewhat more p-xylene at the expense of somewhat less o-xylene.

We claim as our invention:

1. The process for the selective catalytic isomerization of xylenes in the presence of ethyl benzene which comprises contacting a xylene fraction containing at least 8% ethyl benzene and at least one xylene in more than its equilibrium concentration and substantially devoid of aliphatic hydrocarbons with a xerogel catalyst consisting of alumina promoted with between 0.5% and 5% of fluorine and devoid of hydrogenation promoters in the presence of hydrogen under a pressure of from 50 to 1000 p. s. i. g. and at a temperature between 350° C. and 485° C. below that causing any appreciable splitting of alkyl groups, whereby the xylene is selectively isomerized to the exclusion of ethyl benzene.

2. The process for the selective catalytic isomerization of xylenes in the presence of ethyl benzene which comprises contacting a xylene fraction containing at least 8% ethyl benzene and at least one xylene in more than its equilibrium concentration and substantially devoid of aliphatic hydrocarbons with a xerogel catalyst consisting of alumina promoted with between 0.5% and 5% of fluorine and devoid of hydrogenation promoters in the presence of hydrogen under a pressure of from 50 to 1000 p. s. i. g. and at a temperature between 350° C. and 485° C. below that causing any appreciable splitting of alkyl groups, whereby the xylene is selectively isomerized to the exclusion of ethyl benzene, separating from the resulting product an isomerized xylene and recycling at least a part of the remainder to increase the concentration of ethyl benzene in the isomerization step.

GEORGE HOLZMAN.
GEORGE M. GOOD.

References Cited in the file of this patent

UNITED STATES PATENTS

| Number | Name | Date |
|---|---|---|
| 2,301,913 | Veltman | Nov. 17, 1942 |
| 2,336,165 | Connolly | Dec. 7, 1943 |
| 2,425,559 | Passino et al. | Aug. 12, 1947 |
| 2,564,388 | Bennett et al. | Aug. 14, 1951 |

FOREIGN PATENTS

| Number | Country | Date |
|---|---|---|
| 637,595 | Great Britain | May 24, 1950 |